United States Patent [19]

Inoue

[11] Patent Number: 5,452,782
[45] Date of Patent: Sep. 26, 1995

[54] TEMPERATURE SENSITIVE FLUID-TYPE FAN COUPLING DEVICE

[75] Inventor: Hiroshi Inoue, Numazu, Japan

[73] Assignee: Usui Kokusai Sangyo Kaisha Ltd., Japan

[21] Appl. No.: 140,038

[22] PCT Filed: Mar. 1, 1993

[86] PCT No.: PCT/JP93/00254

§ 371 Date: Jan. 24, 1994

§ 102(e) Date: Jan. 24, 1994

[87] PCT Pub. No.: WO93/17253

PCT Pub. Date: Aug. 2, 1993

[30] Foreign Application Priority Data

Feb. 27, 1992 [JP] Japan .................... 4-18322

[51] Int. Cl.$^6$ ............................................. F16D 35/00
[52] U.S. Cl. ............................ 192/58 B; 192/82 T
[58] Field of Search .................... 192/58 A, 58 B, 192/82 T

[56] References Cited

U.S. PATENT DOCUMENTS

| | | | |
|---|---|---|---|
| 2,879,755 | 3/1959 | Weir | 123/41.12 |
| 2,988,188 | 6/1961 | Tauschek | 192/82 T |
| 3,002,595 | 10/1961 | Weir | 192/588 X |
| 3,059,745 | 10/1962 | Tauschek | 192/58 B |
| 3,217,849 | 11/1965 | Weir | 192/82 T |
| 3,259,221 | 7/1966 | Godfrey | 192/58 B |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,642,105 | 2/1972 | Kikuchi | 192/58 B |
| 3,727,735 | 4/1973 | La Flame | 192/58 B |
| 3,741,359 | 6/1973 | Leichliter | 192/58 A X |
| 3,840,101 | 10/1974 | Peter et al. | 192/58 B |
| 3,856,122 | 12/1974 | Leichliter | 192/58 B |
| 3,893,555 | 7/1975 | Elmer | 123/41.12 |
| 3,964,582 | 6/1976 | Mitchell | 192/58 B |
| 4,103,515 | 8/1978 | Barrett | 192/58 A |
| 4,238,016 | 12/1980 | Yoshida et al. | 192/58 B |
| 4,281,750 | 8/1981 | Clancey | 192/58 B |
| 4,403,684 | 9/1983 | Haeck | 192/58 B |
| 4,505,367 | 3/1985 | Martin | 192/58 B |
| 4,629,046 | 12/1986 | Martin | 192/58 B |
| 4,665,694 | 5/1987 | Brunken | 60/330 |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 123/41.12 |

(List continued on next page.)

FOREIGN PATENT DOCUMENTS

| | | | |
|---|---|---|---|
| 54-25581 | 8/1979 | Japan . | |
| 55-76226 | 6/1980 | Japan . | |
| 57-1829 | 1/1982 | Japan | 192/82 T |
| 57-167533 | 10/1982 | Japan . | |
| 57-179431 | 11/1982 | Japan . | |
| 59-27452 | 7/1984 | Japan . | |
| 62-124330 | 6/1987 | Japan . | |
| 62-194038 | 8/1987 | Japan | 192/58 B |
| 63-182332 | 11/1988 | Japan . | |

*Primary Examiner*—Andrea L. Pitts
*Attorney, Agent, or Firm*—Anthony J. Casella; Gerald E. Hespos

[57] ABSTRACT

A temperature sensitive fluid-type fan coupling device is provided. The device includes a rotating shaft having a hollow housing rotatably mounted on one end. The housing is divided into an oil basin chamber and a torque transmission chamber. A driving disc is securely mounted to the driving shaft and is disposed within the torque transmission chamber of the housing. The driving disc is substantially hollow and includes a plurality of radially aligned walls extending inwardly from outer circumferential portions thereof. A through hole extends through a central portion of a side wall of the driving disc opposite the rotating shaft. A plurality of apertures extend through the opposed side wall of the driving disc at radially outer positions thereon. Oil flow into and out of the hollow driving disc is controlled to avoid accompanying rotation during the short period of time after starting the engine.

7 Claims, 13 Drawing Sheets

U.S. PATENT DOCUMENTS

| | | | |
|---|---|---|---|
| 4,846,331 | 7/1989 | Ono | 192/58 B |
| 4,850,465 | 7/1989 | Ono | 192/58 B |
| 4,903,643 | 2/1990 | Takikawa et al. | 123/41.12 |
| 4,903,805 | 2/1990 | Ono | 192/58 B |
| 4,930,458 | 6/1990 | Takikawa et al. | 123/41.12 |
| 5,004,085 | 4/1991 | Taureg | 192/58 B |
| 5,018,612 | 5/1991 | Takikawa et al. | 192/58 B |
| 5,060,774 | 10/1991 | Takikawa | 192/58 A |
| 5,090,533 | 2/1992 | Inoue . | |
| 5,101,949 | 4/1992 | Takikawa et al. . | |
| 5,109,965 | 5/1992 | Inoue . | |
| 5,119,920 | 6/1992 | Inoue . | |
| 5,125,491 | 6/1992 | Takikawa et al. . | |
| 5,139,125 | 8/1992 | Takikawa et al. | 192/58 B |
| 5,232,074 | 8/1993 | Watanabe . | |

TEMPERATURE SENSITIVE FLUID-TYPE FAN COUPLING DEVICE

TECHNICAL FIELD

The present invention is directed to a further improvement of a temperature sensitive fluid-type fan coupling device which has been disclosed in Tokkai-Hei 1-135929 by the present applicants; said temperature sensitive fluid-type fan coupling device controls the rotation of a fan for cooling an automobile engine and provides a continuous flow of the cooling air to the engine in accordance with the running conditions of the automobile.

BACKGROUND ART

A conventional fan coupling device of the aforementioned type comprises a driving disc which is secured to a rotating shaft body, and an idle oil basin chamber which has a hollow inner core. Furthermore, on outer periphery wall portion of said idle oil chamber, there is a small diameter hole leading to a torque transfer chamber having a certain diameter hole through which the amount of oil supply can be controlled so that it will be less than the amount of oil exhausting from a dam member disposed at inner periphery wall portion of the oil on the side of the closed housing where oil can be stored. As a result, by controlling the "accompanying rotation" of the fan for the engine starting with an aid of the existence of said small diameter hole, a rapid increase of rotation can be prevented, abnormal fan noise can be reduced as well, in addition to the warm-up operation that can furthermore be promoted.

Although the above prior arts achieve these purposes to some extent, are they neither sufficient nor they are satisfactory. Particularly, the conventional type of the fan coupling device has been known to have a trend that does not control properly the "accompanying rotation" for a short period of time immediately after the engine starts while the operation condition under the repeated low revolution is shifted to the high rotation stage.

It is, therefore, an object of the present invention to provide a temperature sensitive fluid-type fan coupling device with which the "accompanying rotation" of the fan which momentarily stops while holding a large amount of oil inside the torque transfer chamber as a result of the aforementioned conventional technology, can be controlled for a short period of time immediately after the engine starting so that reduction of the fan noise can be achieved and warm-up operation in the winter or cold season can be promoted which improves upon and avoids the drawbacks of the fan coupling device of the prior art.

It is a more specific object of this invention to provide a temperature sensitive fluid-type fan coupling device with which the "accompanying rotation" phenomenon of the fan when the low rotation operation is rapidly shifted to a high revolution stage can be extremely effectively controlled, since the amount of enclosed oil can be significantly reduced to be of a regulated quantity.

It is another object of this invention to provide a temperature sensitive fluid-type fan coupling device with which the oil temperature can be effectively transferred outside through a heat transmission effect of a radial wall to promote a heat radiation effect.

DISCLOSURE OF INVENTION

To achieve the aforementioned objects, in accordance with an aspect of this invention, a temperature sensitive fluid-type fan coupling device having a rotating shaft body with a driving disc being secured to its distal end thereof comprises a closed housing composed of a cover and a casing to which a cooling fan is installed on the outer periphery portion, a partition board which acts to separate the inside portion of said closed housing into an oil basin chamber and a torque transfer chamber in which said driving disc is disposed, a dam member attached to an inner circumferential wall of the closed housing facing to outer periphery wall surface of the driving disc where oil is stored during rotation, a circulatory passage connecting to said dam member leading from the torque transfer chamber to the oil basin chamber, and a valve member which is provided inside the oil basin chamber on one end thereof. Furthermore, the other end of said valve member is meant to open when the ambient temperature exceeds the predetermined temperature and closes when it is below the pre-set temperature in accordance with the deformation caused by changes in temperatures sensed with a temperature sensing member that is provided on a front surface of said cover. Moreover, by utilizing the presently invented fan coupling device, an effective contact area of the oil at a torque transfer gap disposed at an opposing wall surface near by outside area defined by the driving disc and said closed housing can be increased or decreased. A rotation torque transfer can also be controlled from the rotating shaft body side of the driving side to the closed housing which is a non-diriving member. According to this invention, the fan coupling device is constructed with the driving disc diposed to oppose the dam member; said disc has a thickened width on the entire periphery surface. The fan coupling device is moreover constructed with a storage chamber having radial wall formed on inner portion of said driving disc projecting from inner circumferential surface along a radial direction. The fan coupling device is further constructed with a small diameter hole provided between said radial walls at a location which is slightly inward from the circumferential surface of the driving disc back wall surface opposing to the oil basin chamber and a through hole disposed near by the central portion of the driving disc front wall surface. The fan coupling device is moreover constructed with a plurality of storage chamber so that it will separate inside the driving disc by extending the radial wall aligned in a radial direction to the proximity of the through hole provided near by said central portion. According to this invention, said small diameter hole is provided in the vicinity of the root portion of said radial wall sections opposing to a rotating direction. The width of the driving disc is designed to be more than 10.0 mm.

With the structures described above, the temperature sensitive fluid-type fan coupling device is mainly composed of several sub structures; namely, they include a dam structure disposed on the entire periphery surface with thickened width of the driving disc, a through hole structure provided in the proximity of the central front side wall, a storage structure having a radial wall projecting from inner circumferential surface therein to a radial direction, and a position structure of a small diameter hole formed slightly inward from the periphery surface at the back wall of the driving disc. With the aid of the aforementioned sub structures, the oil in the torque transfer chamber at a stop position of the engine can be introduced immediately to the separated chamber through the through hole which is arranged near by the central portion, even if a large amount of oil remains in the torque transfer chamber. Hence the oil residue in said torque transfer chamber can be minimized. In order to supply the small amount of remaining oil in the storage chamber gradually to the torque transfer chamber through said small diameter hole upon the engine starting position, it is obviously and ideally required to control the duration of the "accompanying rotation" of the fan at an extremely short period of time immediately after the engine starting. The "accompanying rotation" phenomena, associated with conventional devices caused by either using a high viscous fluid or a rapid shifting from low revolution (namely, 1,000 rpm) to a high rotation stage operated at an intermediate temperature (about 80° C.) accompanied with insufficient dam function (in other words, insufficient relative revolution) of low torque fan coupling device, can be very effectively controlled by introducing a portion of the oil to the storage chamber through the small diameter hole even at the low revolution condition by utilizing the present fan coupling device which will exhibit the dam effect recognized at entire surface of the thickened wall structure of the driving disc, and effect of storage chamber and small diameter hole disposed inside the driving disc. Hence the operating condition can be effectively maintained together with the benefit of using the minimal amount of the oil. Furthermore, at the succeeding shift to the high revolution, the oil in the storage chamber will be fed gradually to the torque transfer chamber through the small diameter hole, so that the fan revolution can be securely obtained.

If the inside portion of said driving disc is constructed with a plurality of storage chamber structures which are separated by radial walls extending to the vicinity of the through hole, the oil supplied through the through hole near by the central portion during the engine stop period will be dammed inside the parts of separated storage chambers, so that only the small amount of the oil stored in some portions of separated storage chamber will gradually be supplied to the torque transfer chamber upon succeeding engine starting. Hence the "accompanying rotation" of the fan can be more effectively controlled immediately after the engine starting. At the same time, although the oil inside the torque transfer chamber will be transferred under the pressure to a circulatory passage through the dam member, other portion of the oil will be reversely transferred through the small diameter hole to the other storage chamber which does not contain oil, this in turn means that the amount of the oil inside the torque transfer chamber can be reduced.

The heat generated by increasing the oil temperature due to the heat transmission effect at the radial walls in the front side surface of the driving disc will be transferred to the rotating shaft body through said radial walls to promote the heat radiation effect.

The above and many other objects, features and advantages of this invention will be more fully understood from the ensuing description of a preferred embodiment of the invention, which is to be read in connection with the accompanying drawings.

BEST MODE OF CARRYING OUT THE INVENTION

Figure 1:
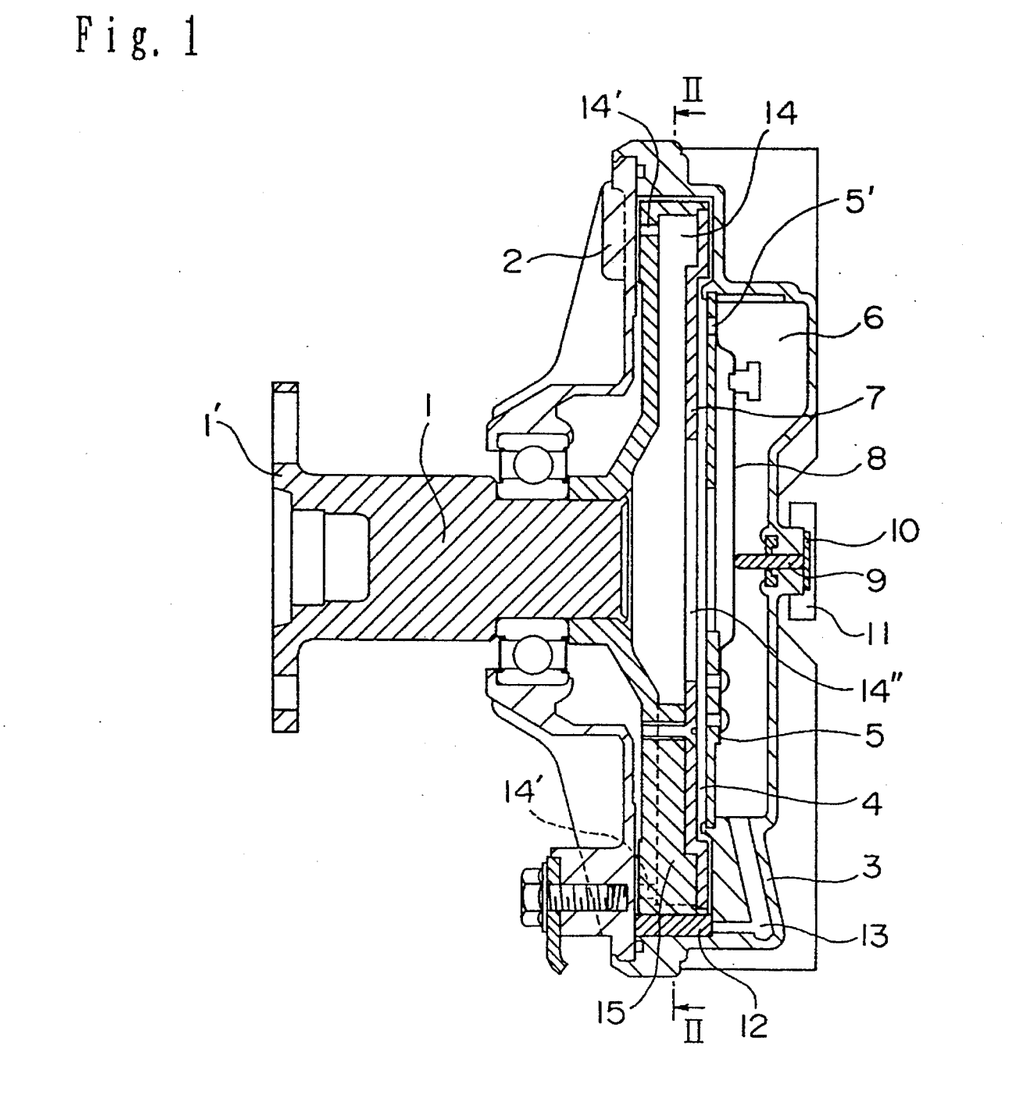
FIG. 1 is a vertical sectional view showing an embodiment of a temperature sensitive fluid-type fan coupling device.
Figure 2:
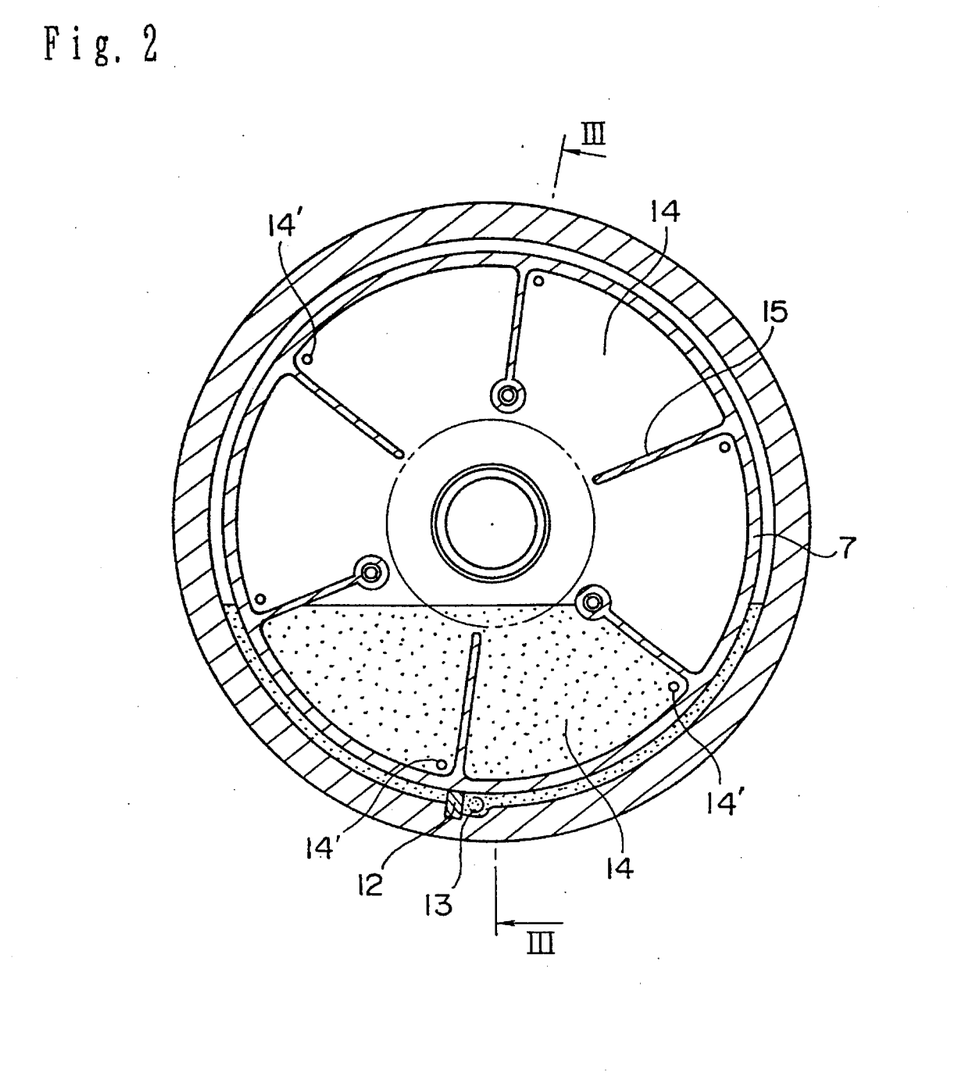
FIG. 2 is a cross-sectional view showing a stop condition of an only driving disc, viewed along the line II—II of FIG. 1.

In FIGS. 1 and 2, there is a rotating shaft body 1, to the distal end of which a driving disc 7 with thickened width (14.5 mm) is provided; said driving disc 7 is constructed of a plurality of storage chambers 14 whose inside is separated by radial walls 15 extending radially to a vicinity of a through hole 14" provided at a central portion of a front side wall surface. A back side wall of said rotating shaft body 1 has an installation flange wall for connecting the rotating shaft body 1 to an opposing base plate to construct a driving side. Said rotating shaft body 1 supports a closed housing as a non-driving side comprising a cover 3 and a casing 2 provided with a cooling fan (not shown) on its outer circumferential portion be means of a bearing. A partition board 5 is provided to separate the inside of the closed housing into an oil basin chamber 6 and a torque transfer chamber 4 in which said driving disc 5 is provided. On the parition board 7, a supply control hole 5' is provided for oil to be transferred from the oil basin chamber 6 to said torque transfer chamber 4. The driving disc 7 inside the torque transfer chamber 4 maintains a clearance between opposing wall surfaces of the closed housing to accommodate oil that achieves the torque transfer to the closed housing defined by the cover 3 and the casing 2. There is furthermore a valve member 8 which acts to open or close the supply control hole 5'; one end of which is riveted to a wall surface of the partition board 5 on the side of the oil basin chamber 6, and the other end of which is positioned at said supply control hole. A temperature sensing member 10 is made of a plate-shaped bimetal whose both ends are engaged to a supporting metal member 11 secured to a front surface of said cover 3. The valve member 8 is connected internally through a connecting rod 9 in such a way that it can correspond to the deformation accompanied with expected changes in the ambient temperatures. A dam member 12 is provided to a portion of the inner circumferential surface of the closed housing opposing to the other circumferential surface of the driving disc 7 which has a damming function of the oil while the rotational operation is going on. The dam member 12 is further positioned to oppose against the entire circumferential surface of the thickened width of the driving disc 7 to achieve a pumping function through a circulatory passage 13 from the torque transfer chamber 14 provided near and in front of the dam member along the rotational direction to the oil basin chamber 6.

There is a small diameter hole 14' provided at either the front, back, or central portion in the proximity of a root portion of a radial wall 15 which is provided on the back wall surface of the driving disc 7 opposing to said oil basin chamber 6 and is separated along the rotational direction. Said small diameter hole 14' is positioned slightly inside from the periphery side surface of the radial wall and is projected to the torque transfer chamber 4.

Figure 3:
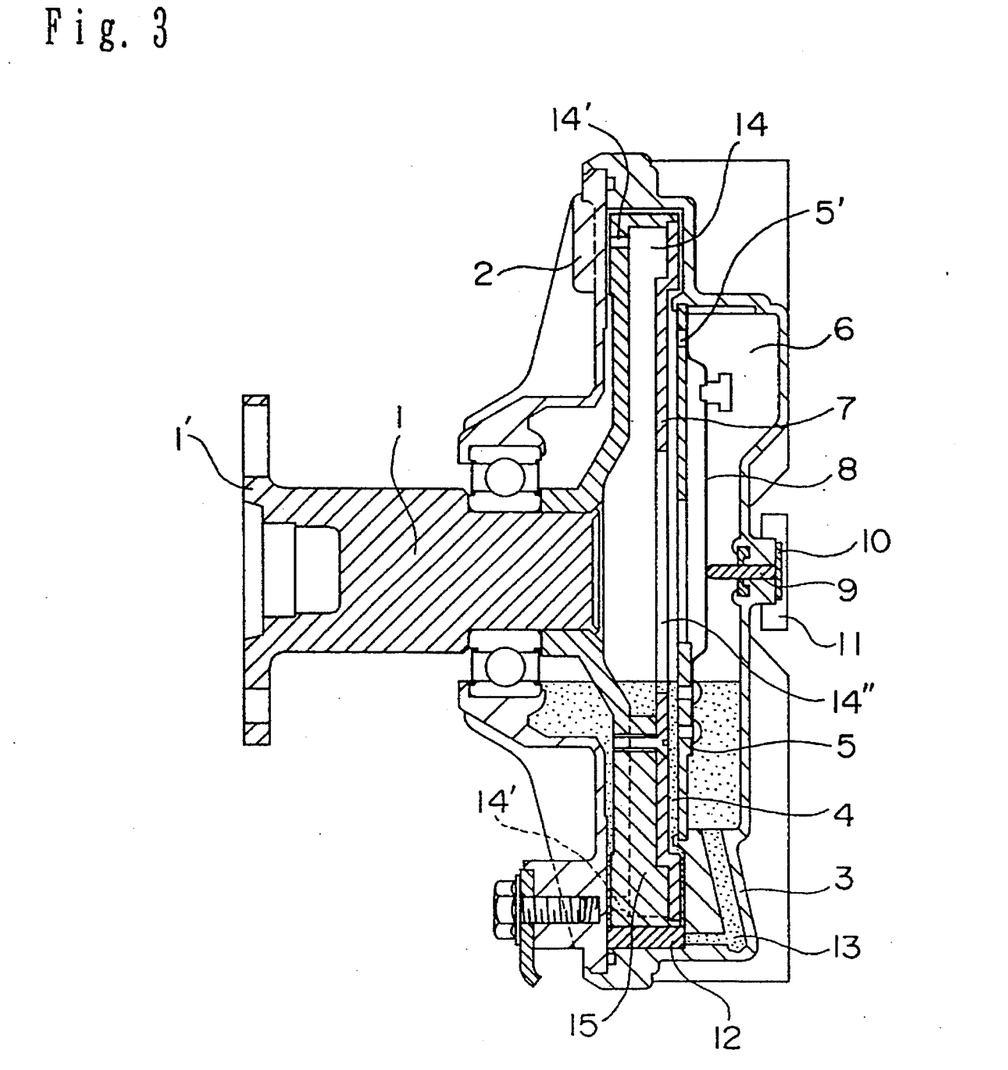
FIG. 3 is a vertical sectional view showing a whole structure of the temperature sensitive fluid-type fan coupling device at a stop position, taken along the line III—III of FIG. 2.

When the engine stops under conditions by which plenty of the oil remains inside the torque transfer chamber 4 or the supply control hole 5' is opened, the oil in the torque transfer chamber 4 will be supplied only to the lower positioned storage chamber 14 separated by radial walls 15 through a through hole 14" (in other words, referring to FIGS. 2 and 3, the oil will be supplied only to the lower two storage chambers 14, 14 and is not fed to any storage chambers located at upper or side portion thereof), so that the amount of the oil remaining in the torque transfer chamber 4 will be reduced.

Figure 4:
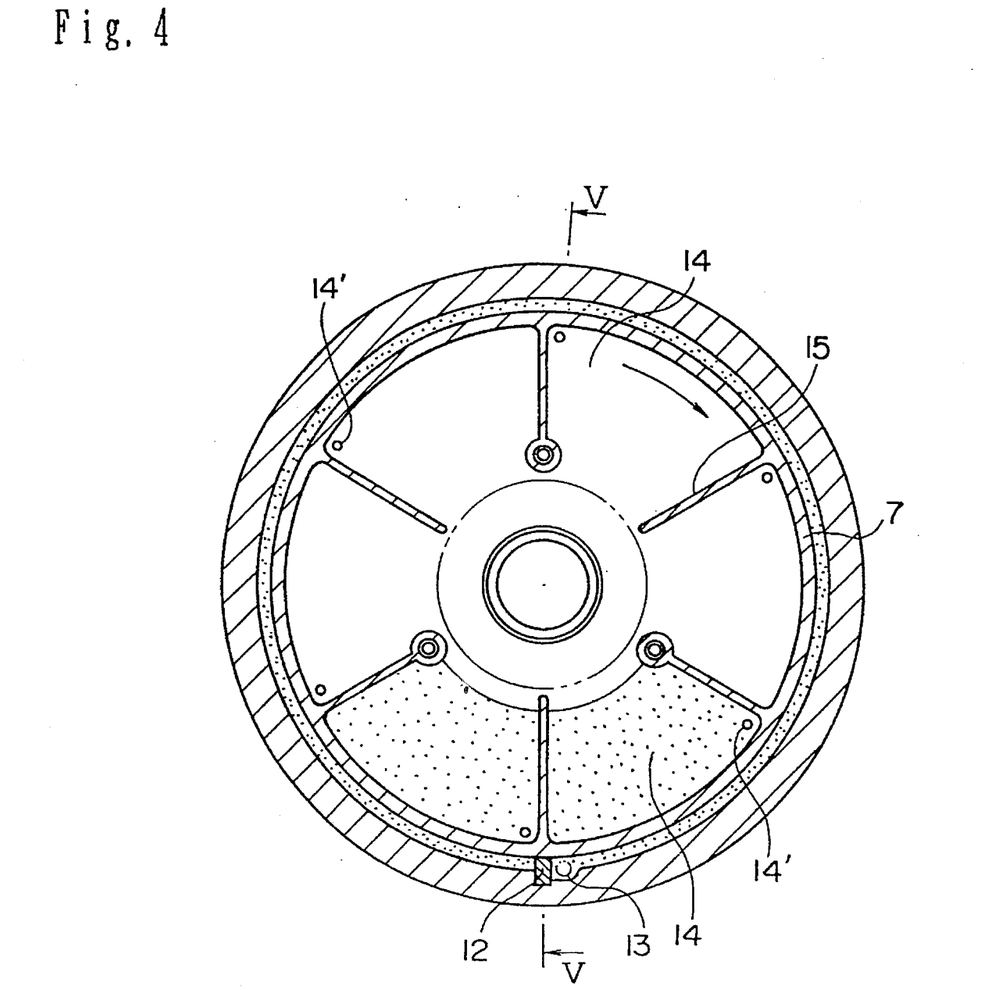
FIG. 4 is a vertical sectional view of the only driving device at the starting rotation stage of FIG. 1.
Figure 5:
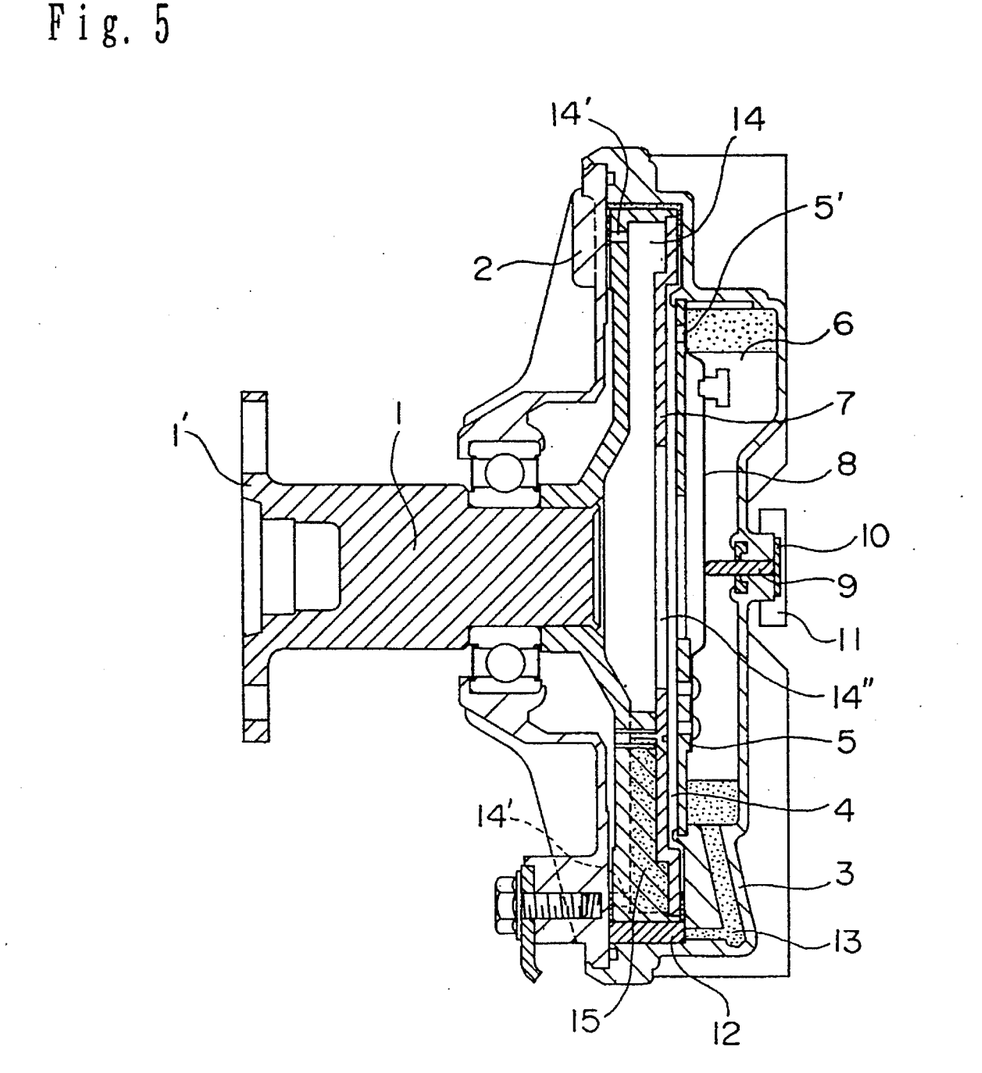
FIG. 5 is a vertical sectional view of the whole structure of the temperature sensitive fluid-type fan coupling device at the starting rotation stage, viewed along the line V—V of FIG. 4.

Once the engine starts with the above conditions, the engine rotates with such a condition that the oil will exist in only storage chambers 14, 14 located in the lower portion at the engine stop condition and the rest of storage chamber will rotate with oil-less condition. On the other hand, although the oil will be transferred from the small diameter hole 14', 14' to the torque transfer chamber 4 by a centrifugal force caused by a rotation of the driving disc 7, the flowing of the oil into the torque transfer chamber 4 is accompanied by only supplying through said two small diameter holes 14', 14' from said two storage chambers and no flow of the oil will be taking place from the remaining of the storage chambers 14, so that the total amount of the flowing oil will be extremely small.

Although the oil pressurized by the dam member 12 will be transferred under the pressure to the circulatory passage 13, a part of the transferring oil will be supplied into many storage chambers 14 containing no oil through small diameter hole 14', resulting in that the amount of oil remaining inside the torque transfer chamber will furthermore be reduced.

In other words, by a single hollow storage chamber which is not separated by the radial walls 15, the oil inside the storage chamber will be pressurized under a centrifugal force caused by the driving disc 7 upon the engine starting to the entire circumferential wall of the storage chamber and transferred to the torque transfer chamber through the small diameter hole. However, according to this invention, the oil will be fed through limited number of small diameter holes and a portion of the oil will reversely be transferred to the storage chamber, indicating that the amount of oil flowing into the torque transfer chamber will become extremely small.

Therefore, the "accompanying rotation" phenomena that is taking place immediately after the engine starting can be controlled within extremely short period of time under a pumping action of the oil in the torque transfer chamber 4 inside the dam member 12.

Figure 6:
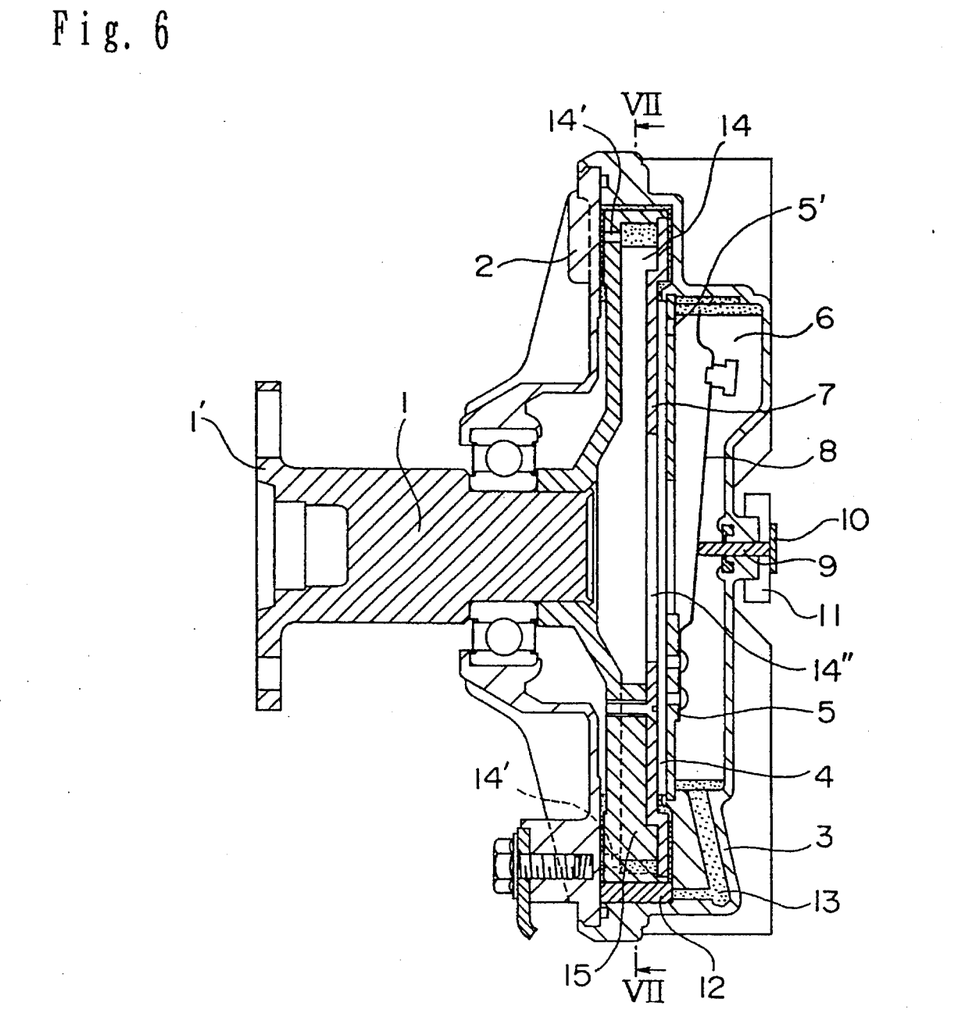
FIG. 6 is a diagram for a constant rotational period during operationa condition of FIG. 1.
Figure 7:
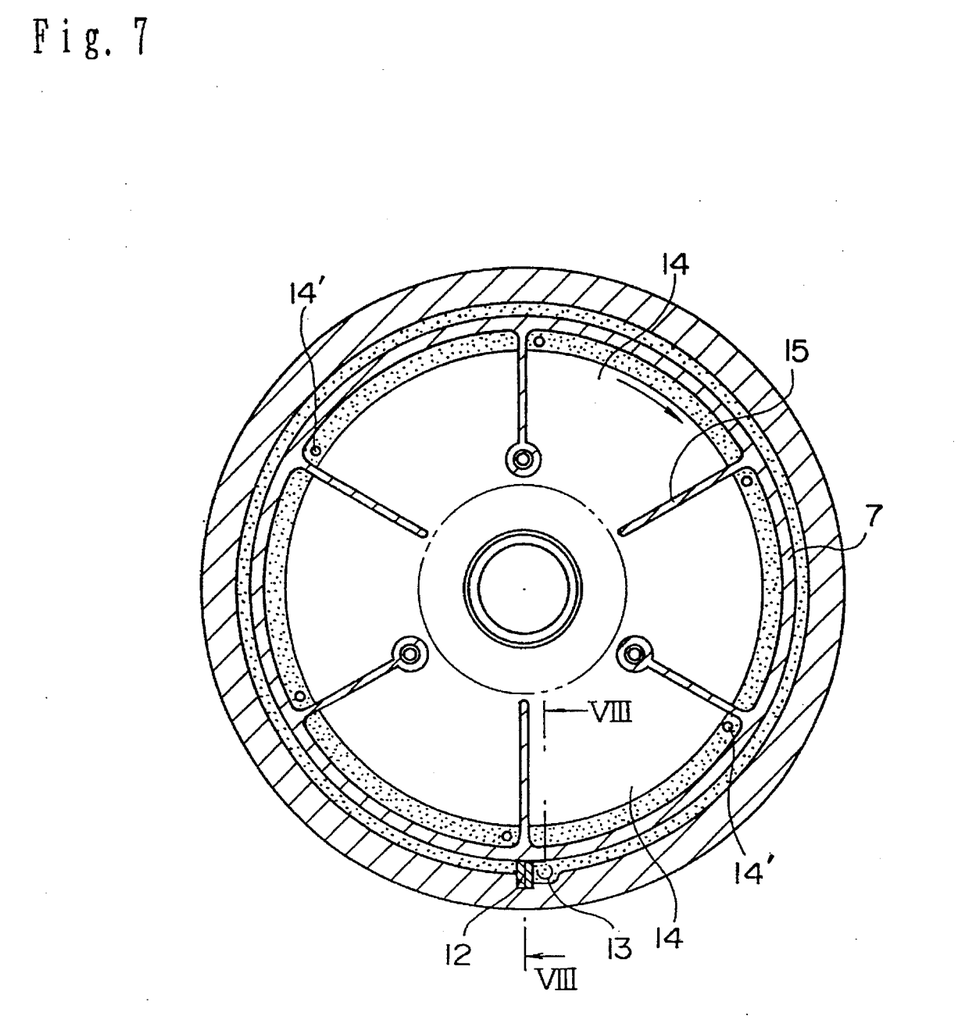
FIG. 7 is a vertical sectional view showing the constant rotational period of the only disc, taken along the line VII—VII of FIG. 6.
Figure 8:
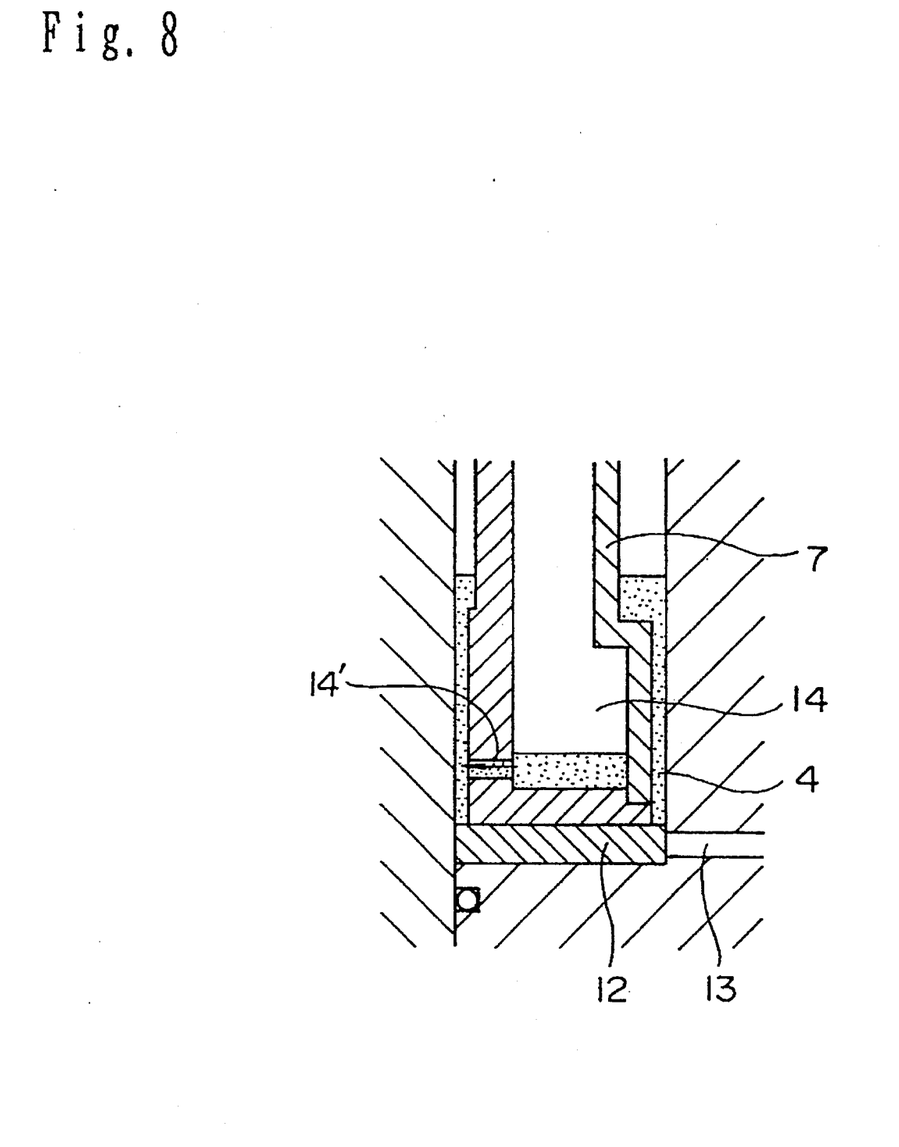
FIG. 8 is a fragmentary and partially enlarged sectional view of the main portion of this invention including a storage chamber, a small diameter hole and a dam member, taken along the line VIII—VIII of FIG. 7.

Operational condition under a constant revolution with opened position of the supply control hole 5' are illustrated in FIGS. 6 through 8, in which the oil stored inside the storage chamber 14 will gradually be supplied from the small diameter hole 14' to the torque transfer chamber 5' by an aid of a centrifugal force due to a rotation of said driving disc 7. At the same time, the oil inside the oil basin member 6 will be supplied to the torque transfer chamber 4 through the supply control hole 5' to transfer a rational movement of the driving disc 7 to the closed housing which is a non-driving side. On the other hand, the oil inside the torque transfer chamber 4 will be pumped by the dam member 12 and exhausted to the oil basin chamber 6 through the circulatory passage 13.

Figure 9:
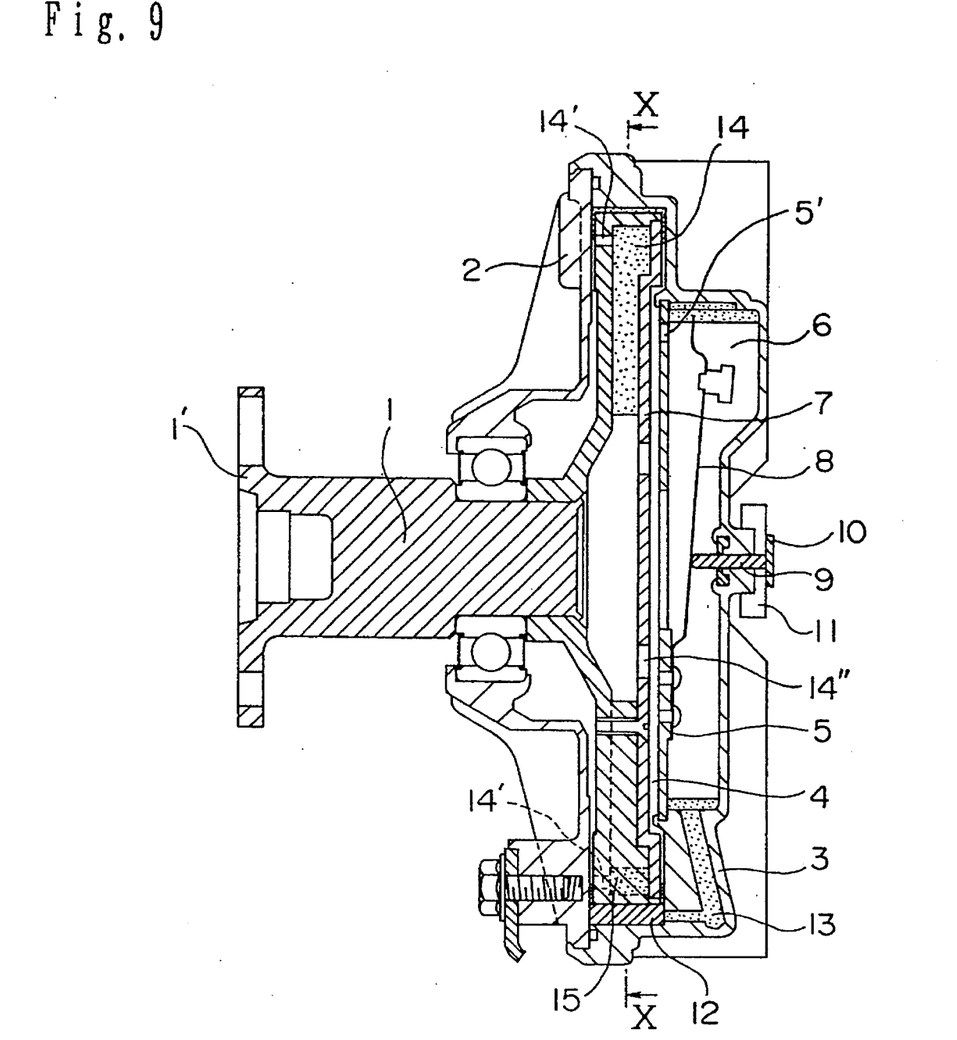
FIG. 9 is a diagram showing a rapidly high revolution stage at an operation condition according to the other embodiment of the fan coupling device according to the present invention.
Figure 10:
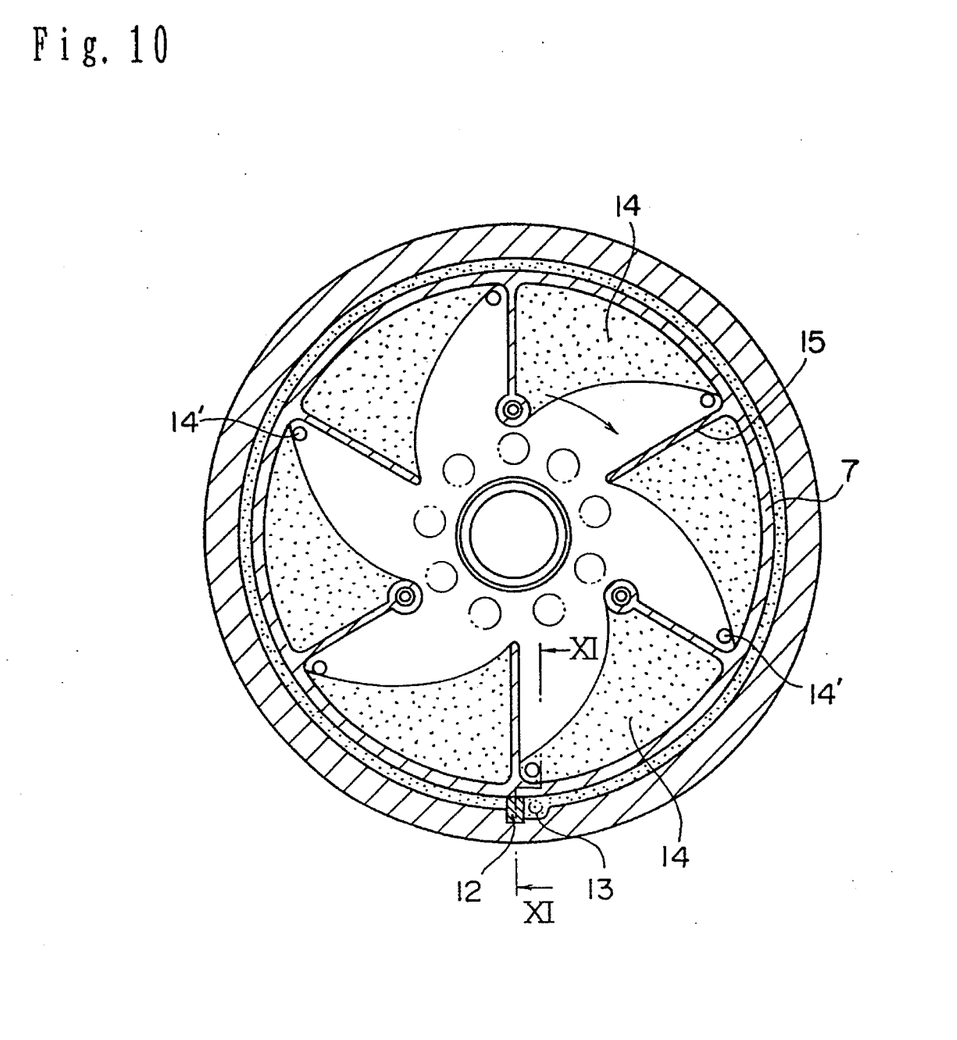
FIG. 10 is a vertical sectional view of the only driving device at the rapidly high revolution stage, taken along the line X—X of FIG. 9.
Figure 11:
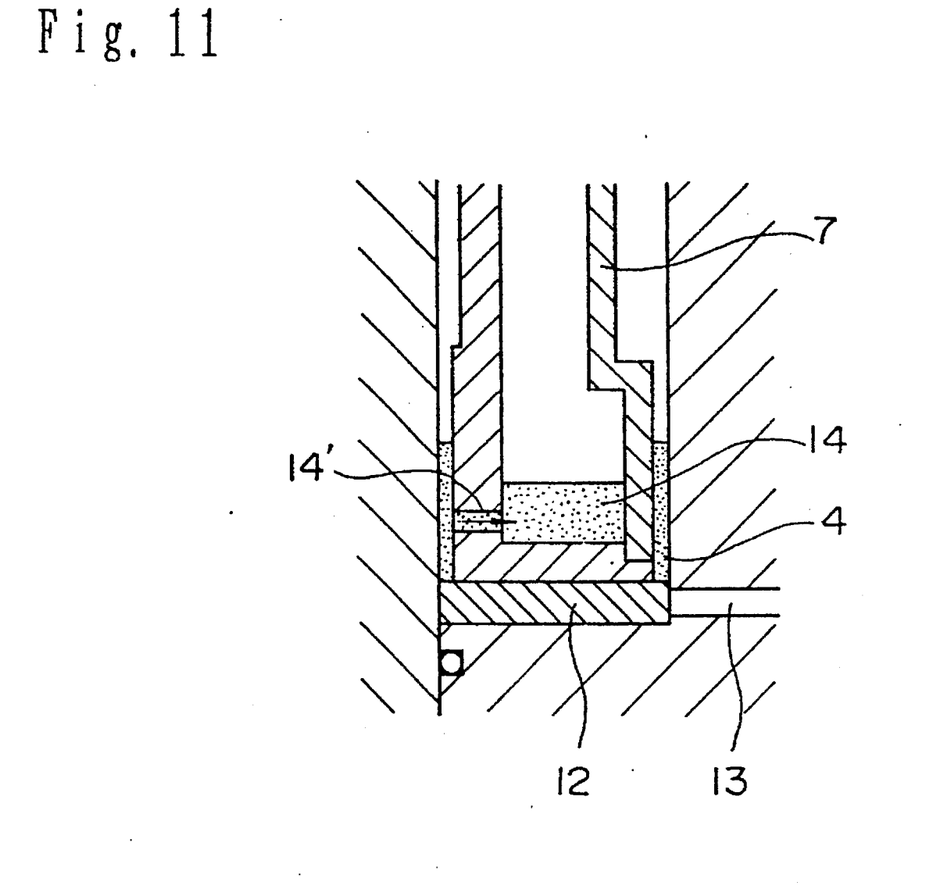
FIG. 11 is a fragmentary and partially enlarged sectional view of the main portion of this invention including a storage chamber, a small diameter hole and a dam member, taken along the line XI—XI FIG. 10.
Figure 13:
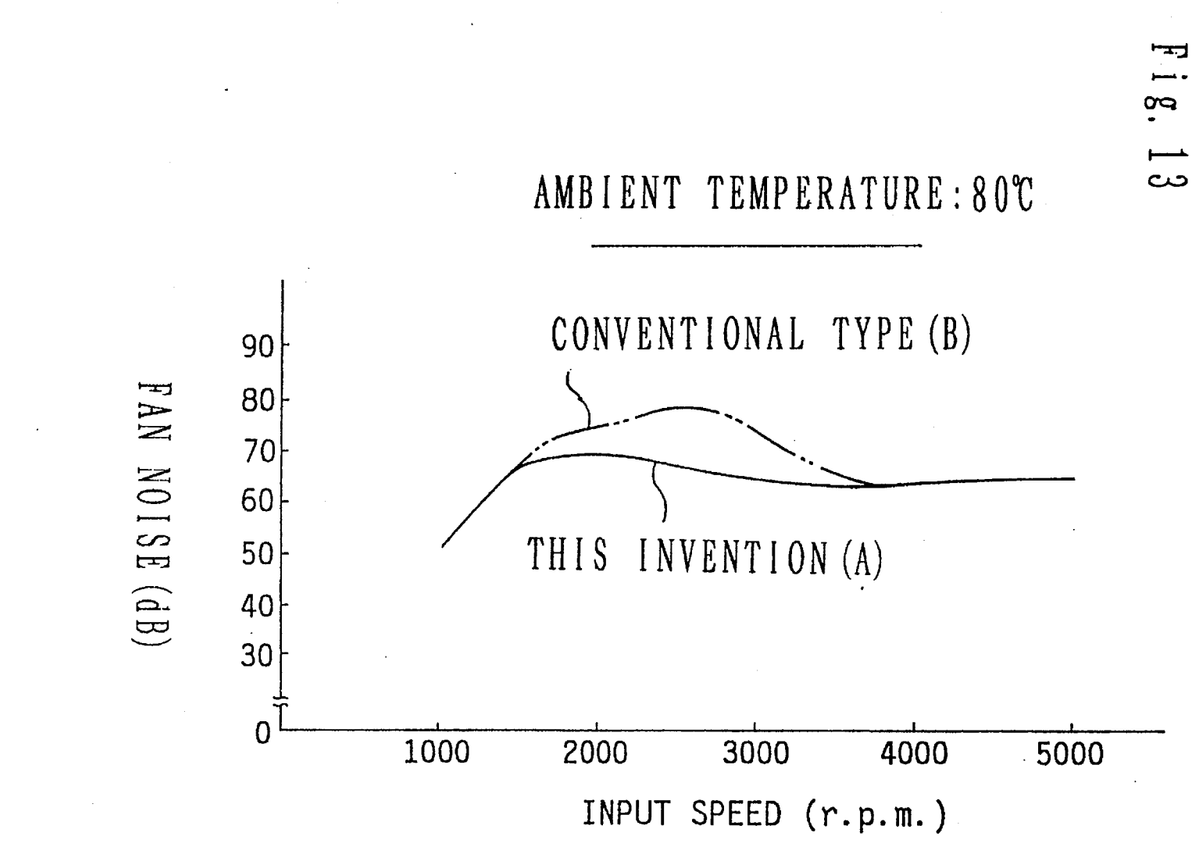
FIG. 13 shows a characteristic noide curve of the present invention (A) compared with that of the conventional type (B) of the fan couping device.

During a rapid acceleration from the normally operating condition, the driving disc 7 will be forced to a rapidly high revolution, so that the oil inside the torque transfer chamber 4 will be pressurized by the dam member 12. A part of the pressurized oil will be exhausted to the oil basin chamber 6 through the circulatory passage 13 by a pumping action of the dam member 12, and other part thereof will be momentarily fed to the storage chamber 14 through the small diameter hole 14', as seen in FIGS. 9 through 11, resulting in that the amount of the oil in the torque transfer chamber 4 will be reduced and the "accompanying rotation" phenomena which might occur on a rapid acceleration can be prevented. For example, FIG. 13 shows characteristic noise curves when a rapid acceleration has been taking place from 1,000 rpm to 5,000 rpm with 10 seconds at the ambient temperature of 80° C.; (A) is a result from the present invention; while (B) represents a noise curve resulting from the conventional type.

Figure 12:
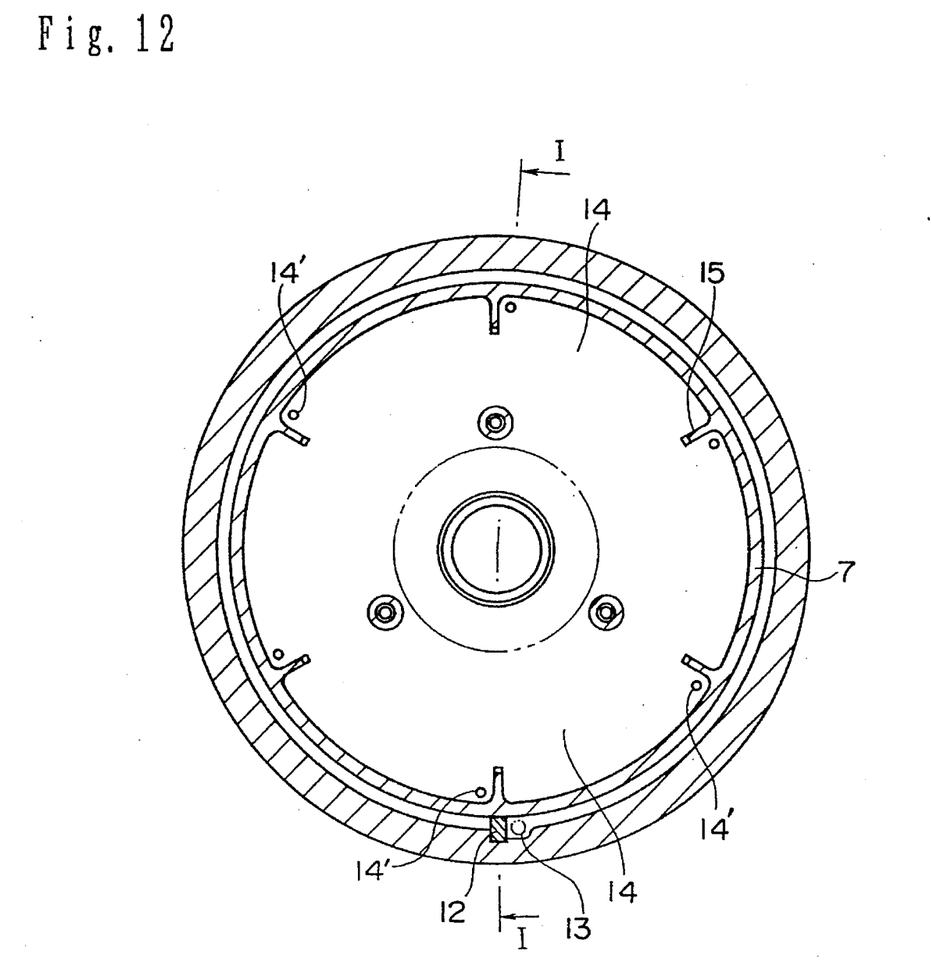
FIG. 12 is a similar figure as FIG. 1 showing the further other embodiment of the present invention.

It is preferable that the width of the driving disc 7 is more than 10.0 mm. If the width of said driving disc 7 is less than 10.0 mm, the "accompanying rotation" taking place during a rapid shift from low revolution to a high rotation cannot be effectively prevented. The number of through holes 14" projected at a central portion of the front side wall portion is not limited to one (1) as described in the above embodiment, but a plurality of through holes can be arranged along a concentric circle, as seen in FIGS. 9 and 10. Although the prevention efficiency of the "accompanying rotation" will be slightly reduced if the radial wall 15 is formed with relatively small rectangular-shaped size as seen in FIG. 12, it is found that the "accompanying rotation" phenomena upon a rapid acceleration from the normal operation to a rapid revolution can be similarly prevented.

INDUSTRIAL APPLICABILITY

As described in the above, the temperature sensitive fluid-type fan coupling device according to the present invention is composed of the driving disc 7 with thickened width, a dam member 12 structure provided on the entire circumferential surface, the through hole 14" provided in vicinity of the central portion of the front side wall of driving disc 7, and the projected small diameter hole 14' being positioned at outward location of storage chamber 14 having radial walls 15 (preferably a plurality of storage chamber 14 separated by radial wall 15 extending to the proximity of said through hole 14"). With the thus constructed fan coupling device, the oil in the torque transfer chamber 4, during the stop position at high temperature operating condition, is supplied inside the storage chamber 14 through the through hole 14". The "accompanying rotation" at the fan side can be controlled at a short period of time at the succeeding engine starting position, abnormal fan noise level can be reduced, and the warm-up operation in winter or in a cold season can furthermore be promoted. By a rapid acceleration during a normal operation, a part of the oil pressurized by the dam member 12 inside is supplied inside the storage chamber 14 through the small diameter hole 14' to maintain the operating condition with minimized amount of required oil. Hence the "accompanying rotation" phenomena of the fan, even if a low revolution operating condition is rapidly shifted to a high rotation operation, can be extremely and effectively controlled. Moreover, by the heat radiation effect at the radial wall 15, the heat due to increasing oil temperature at the front side driving disc can be transferred to the rotating shaft body 1 through the radial wall 15 to promote the heat radiation effect.

I claim:

1. A temperature sensitive fluid-type fan coupling device comprising:

a rotating shaft having opposed proximal and distal ends;

a hollow fan housing having a partition dividing said said hollow fan housing into an oil basin chamber and a torque transfer chamber, said partition having a supply control hole therethrough providing communication between said oil basin chamber and said torque transfer chamber, said hollow fan housing being rotatably mounted to said shaft through a bearing such that said distal end of said shaft is within said torque transfer chamber, said hollow fan housing further including a dam at a radially outer position of said torque transfer chamber, a passage extending through the hollow fan housing between the oil basin chamber and a location in the torque transfer chamber substantially adjacent the dam;

a temperature sensing member external of said hollow fan housing and being deformable in response to temperature changes;

a valve having a first portion connected to said temperature sensing member and a second portion to selectively open and close said supply control hole in response to the deformation of said temperature sensing member due to temperature changes; and a driving disc in said torque transfer chamber and including a rear side wall securely mounted to said shaft, a front side wall disposed between and spaced from said rear side wall and said partition and an outer circumferential wall extending between and connecting said front and rear side walls such that an oil storage chamber is defined within said driving disc, a central through hole being formed through said front side wall and providing communication between said torque transfer chamber and said oil storage chamber, a plurality of radial walls extending inwardly from said outer circumferential wall in said oil storage chamber, and a plurality of apertures being formed through outer circumferential portions of said rear side wall in proximity respectively to said radial walls.

2. The temperature sensitive fluid-type fan coupling device of claim 1 wherein a plurality of the radial walls extend in the radial direction to the vicinity of the through hole in the central portion of the front side wall such that a plurality of separate storage chambers are defined inside said driving disc.

3. The temperature sensitive fluid-type fan coupling device of claim 1 wherein each said aperture is substantially adjacent the respective radial wall and on a leading side of the respective radial wall with respect to a rotation direction of said driving disc.

4. The temperature sensitive fluid-type fan coupling device of claim 1 wherein said driving disc is at least more than 10.0 mm thick measured parallel to said shaft.

5. The temperature sensitive fluid-type fan coupling device of claim 2 wherein each said aperture is substantially adjacent the respective radial wall and on a leading side of the respective radial wall with respect to a rotation direction of said driving disc.

6. The temperature sensitive fluid-type fan coupling device of claim 2 wherein the thickness of said driving disc measured in an axial direction is at least more than 10.0 mm.

7. The temperature sensitive fluid-type fan coupling device of claim 3 wherein said driving disc is at least more than 10.0 mm thick measured parallel to said shaft.

* * * * *